(12) United States Patent
Figenschou

(10) Patent No.: US 7,754,966 B2
(45) Date of Patent: *Jul. 13, 2010

(54) UMBILICAL

(75) Inventor: Arild Figenschou, Billingstad (NO)

(73) Assignee: Aker Kvaerner Subsea AS, Lysaker (NO)

( * ) Notice: Subject to any disclaimer, the term of this patent is extended or adjusted under 35 U.S.C. 154(b) by 159 days.

This patent is subject to a terminal disclaimer.

(21) Appl. No.: 11/628,662

(22) PCT Filed: Jun. 17, 2005

(86) PCT No.: PCT/NO2005/000216

§ 371 (c)(1),
(2), (4) Date: Dec. 6, 2006

(87) PCT Pub. No.: WO2005/124095

PCT Pub. Date: Dec. 29, 2005

(65) Prior Publication Data

US 2007/0205009 A1    Sep. 6, 2007

(30) Foreign Application Priority Data

Jun. 18, 2004  (NO)  .................. 20042557
Oct. 28, 2004  (NO)  .................. 20044671

(51) Int. Cl.
*H01B 7/00*   (2006.01)
(52) U.S. Cl. ...................................... 174/47
(58) Field of Classification Search ............ 174/47; 166/367; 405/169
See application file for complete search history.

(56) References Cited

U.S. PATENT DOCUMENTS

| 4,462,717 | A  |   | 7/1984  | Falcimaigne et al.       |
|-----------|----|---|---------|--------------------------|
| 4,569,392 | A  |   | 2/1986  | Peterman                 |
| 5,813,106 | A  | * | 9/1998  | Haug et al. ......... 29/429 |
| 6,046,404 | A  | * | 4/2000  | Figenschou et al. ... 174/47 |
| 6,239,363 | B1 | * | 5/2001  | Wooters ............. 174/47 |
| 6,472,614 | B1 |   | 10/2002 | Dupont et al.            |
| 6,940,054 | B1 | * | 9/2005  | Heggdal ............ 219/629 |
| 2007/0253778 | A1 | * | 11/2007 | Figenschou ......... 405/169 |

FOREIGN PATENT DOCUMENTS

| GB | 1 203 355  A  |   | 8/1970  |
|----|---------------|---|---------|
| GB | 2 326 177  A  |   | 12/1998 |
| GB | 2 326 758  A  |   | 12/1998 |
| WO | WO 99/57413   | * | 11/1999 |
| WO | WO-99/57413 A1 |  | 11/1999 |
| WO | WO-02/057560 A1 |  | 7/2002  |

\* cited by examiner

*Primary Examiner*—Chau N Nguyen
(74) *Attorney, Agent, or Firm*—Birch, Stewart, Kolasch & Birch, LLP

(57) ABSTRACT

An umbilical for transfer of fluids and electric current/signals between the sea surface and equipment deployed on the sea bed, in particular in deep waters, is disclosed. The umbilical comprises a number of pipes (4, 4') and electric conductors/wires (6, 6') collected in a bundle, a filler material (10, 2, 3, 3') lying at least partly around and between the pipes (4, 4') and the conductors/wires (6, 6'), and a protective sheath (1) enclosing the pipes, conductors/wires and filler material. The load carrying elements (7) of the umbilical are light weighted rods (7') of composite material that can either be collected in bundles or appear individually or in a combination thereof.

17 Claims, 5 Drawing Sheets

UMBILICAL

BACKGROUND OF THE INVENTION

The present invention relates to an umbilical for transmission of fluids and electric current/signals between the sea surface and equipment located on the sea bed, in particular in deep waters, comprising a number of pipes and electric conductors/wires collected in a bundle, a filler material arranged at least partly around and between the pipes and conductors/wires, and a protective sheath enclosing the pipes, conductors/wires and filler material.

Umbilicals of this type are constructed as a composed structure which is able to transfer hydraulic liquids, chemicals, fluids, electric and optical signals and electric power between equipment on the sea bed and on the sea surface. An early version of such umbilicals is known from WO 93/17176. Typical for this umbilical is that most of the load transfer takes place in a centrally located steel pipe of substantial dimension. Further examples of prior art are disclosed in GB 2 326 177 A and GB 2 326 758 A, all having the same assignee as the present invention.

An International patent application no. PCT/NO05/00215 related to a power umbilical is simultaneously filed.

The above mentioned heavy section steel pipes ad substantial weight to the umbilical due to their own weight. The pipes need to have such large dimensions just because they act as load carrying elements, and not because the transported medium requires this. Thus the sea depth to which the umbilical having the traditional construction can be used is limited.

Instantly it appears as steel rope could be used as load carrying elements. This, however, do not solve the problem in considerable extent. Steel rope also ad substantial weight and in combination with heavy pipes, one do not reach large depths before the umbilical achieves yield stresses and are torn off due to its own weight.

Substantial efforts and resources have been used in order to find a solution on how to be able to use these umbilicals down to the sea bed at real large sea depths, such as 2500 meters and more.

This is now solved by combining a technology that is developed by the assignee of the present invention, viz. the technology that is used for tension legs of floating platforms. See for example WO 02/057560 A1.

SUMMARY OF THE INVENTION

Thus, according to the present invention an umbilical of the introductory said kind is provided, which is distinguished in that the umbilical comprises separate load carrying elements, which load carrying elements are light weighted rods of composite material. The light weight rods of composite material may preferably be carbon rods having embedded strength fibers. The rods can either be collected in bundles or appear individually or in a combination thereof.

Composite material has that excellent property that the material has approx. the same load carrying capacity as steel, at the same time as the weigh is reduced to about 10% of that of steel. Thus the load carrying elements do not contribute substantially to the total weight of the umbilical which thereby provides an option to use the umbilical in deep waters. One may get so much deeper as the weight reduction allows. A typical example of composite material is carbon rods having embedded strength fibers.

In one embodiment the filler material, the pipes and conductors/wires can be laid in a helix or spiral configuration about the longitudinal axis of the umbilical.

In a second embodiment the filler material, the pipes and conductors/wires can be laid in a substantially rectilinear configuration without any essential twisting or spiraling.

The load carrying elements can be collected in a twisted or spiraling bundle that is located centrally as a core element within the umbilical.

As an alternative the load carrying elements of the umbilical can be distributed to a number of bundles located peripheral relative to the longitudinal axis of the umbilical.

As an alternative the umbilical can also include weight elements in order to ad mass/weight to the umbilical, either in all its extent or in some sections.

The filler material, the pipes and the conductors/wires can be laid in several layers viewed in radial direction.

In one embodiment the load carrying elements can consist of single rods that are distributed within the transversal cross section, and some may possibly be located adjacent to each other without thereby being collected in a bundle.

Even if not strictly necessary, the filler material will in a suitable embodiment be in the form of elongated channel elements that are able to at least partly enclose the respective pipes and cables in order to keep these in position relative to each other.

Other and further objects, features and advantages will appear from the following description of preferred embodiments of the invention, which are given for the purpose of description, and given in context with the appended drawings where:

DETAILED DESCRIPTION OF THE INVENTION

It is to be understood that it is possible with two variants of the transversal cross section of the umbilicals shown in FIG. 1-9, which do not appear from the figures, namely one where the individual elements of the umbilical are lying with a certain laying length about the longitudinal axis of the umbilical, and one variant where the individual elements are lying more or less in a straight line substantially parallel to the longitudinal axis of the umbilical. For the detailed construction of a traditional umbilical and how it can be manufactured reference is given to the previously mentioned publication WO 93/17176.

Figure 1:
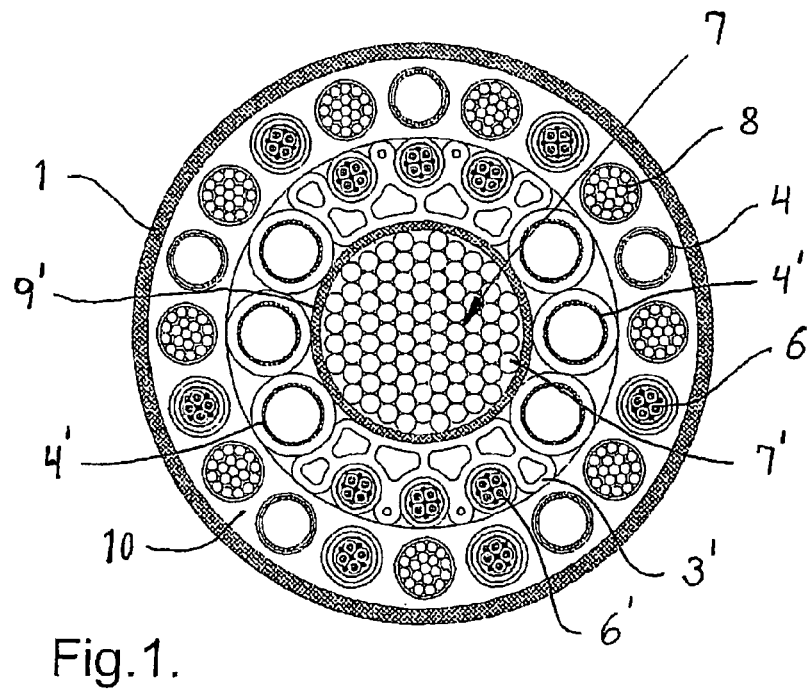
FIG. 1 shows a transversal cross section through a first embodiment of the umbilical according to the invention having load carrying elements centrally located.
Figure 2:
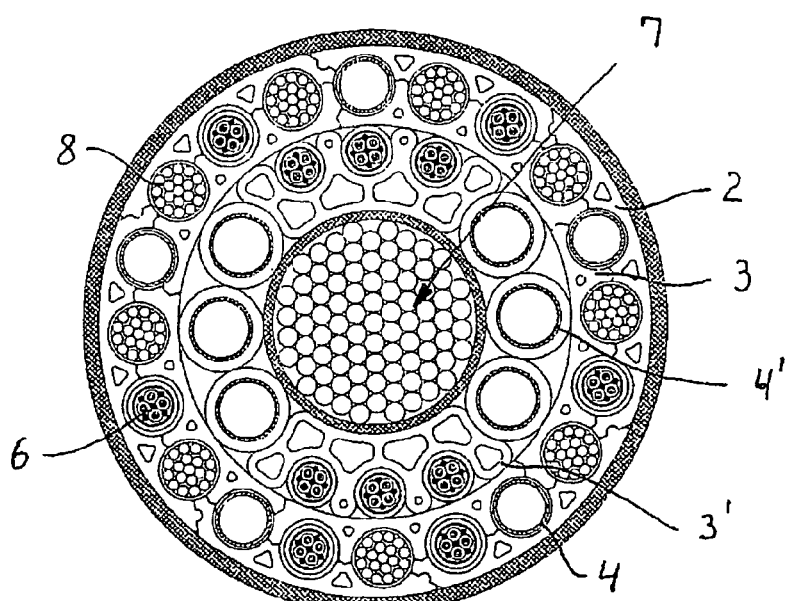
FIG. 2 shows a transversal cross section through a second embodiment of the umbilical according to the invention.
Figure 3:
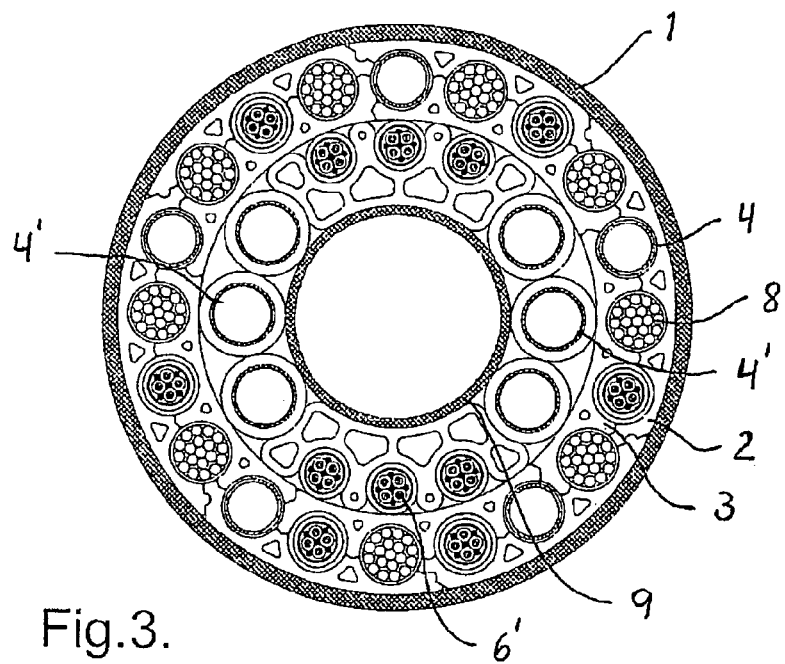
FIG. 3 shows a transversal cross section through another embodiment of the umbilical according to the invention having several load carrying elements peripherally located.

The umbilical according to FIG. 1 is basically constructed of the following elements: load carrying element 7 consisting of a bundle of rods 7' of composite material, inner channel elements 3', for example of polyvinylchloride (PVC), electric conductors/wires 6, 6', fluid pipes 4, 4' normally made of steel, weight elements 8, or further strength elements 8, for example in the form of steel rope, and an outer sheath 1, for example of polyethylene (PE). The reference number 9' can denote a friction material, like a rubber sheath, lying around the load carrying element 7. The reference number 9 can denote a pipe having larger diameter than the fluid pipes 4, 4' as illustrated in FIG. 3. The reference number 10 represents a filler substance different from the channel elements 3' and can be a foam substance or similar. In a practical embodiment the rods 7' are carbon rods having embedded strength fibers. The diameter of such rods is in order of magnitude 6 mm without such dimension should be interpreted as any limitation.

The umbilical according to FIG. 2-6 is basically constructed of the following elements: load carrying element 7 consisting of a bundle of rods 7' of composite material, inner channel elements 3', intermediate channel elements 3, outer channel elements 2, electric conductors/wires 6, 6', fluid pipes 4, 4' normally made of steel, weight elements 8, or further strength elements 8, for example in the form of steel rope, and an outer sheath 1. The reference number 9' can denote a friction material, like a rubber sheath, lying around the load carrying element 7.

Figure 4:
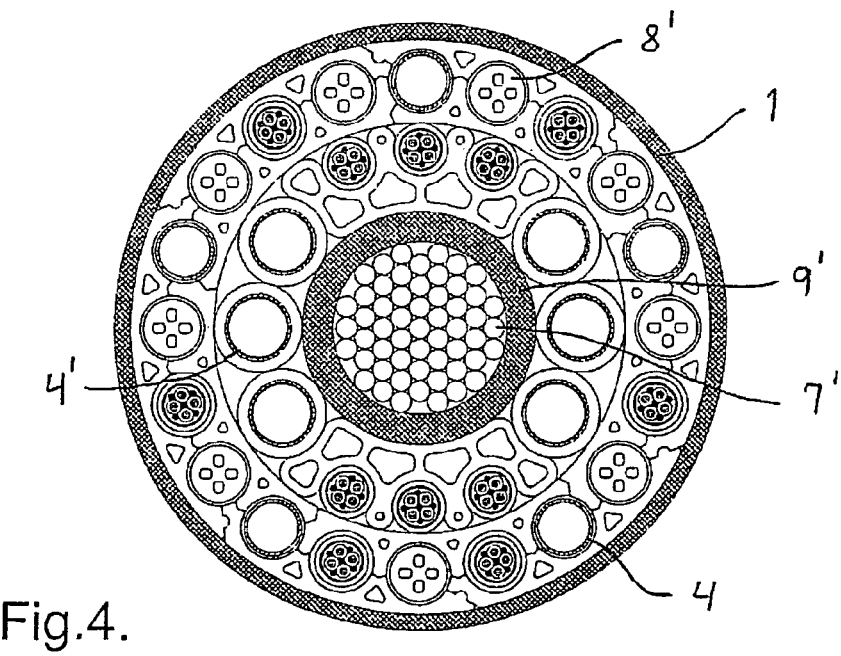
FIG. 4 shows a transversal cross section through another embodiment of the umbilical according to the invention having the load carrying element centrally located.
Figure 5:
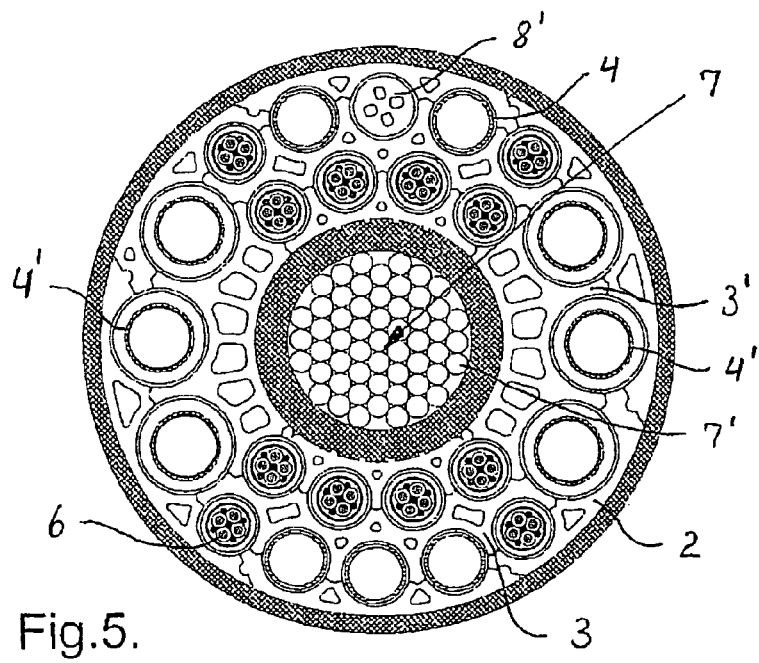
FIG. 5 shows a transversal cross section through still another embodiment of the umbilical according to the invention having the load carrying element centrally located.
Figure 6:
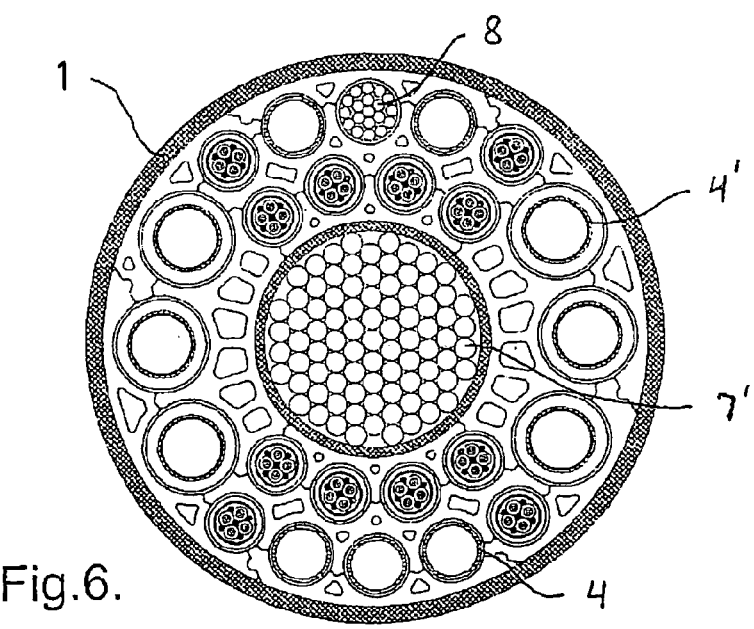
FIG. 6 shows a transversal cross section through still another embodiment of the umbilical according to the invention having the load carrying element centrally located.

These elements are repeatedly found in most of the figures and are denoted with the same reference number in the respective figures. However, it is to be noted that FIG. 4 and 5 are omit the weight elements/strength elements 8 which are replaced with PVC profiles 8'. FIG. 6 shows one single weight element 8.

Figure 7:
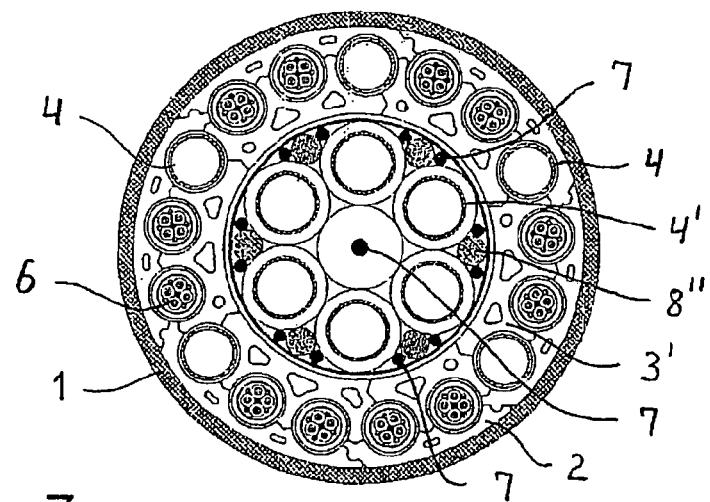
FIG. 7 shows a transversal cross section through still another embodiment of the umbilical according to the invention having the load carrying element centrally located.

FIG. 7 shows in particular a variant having a somewhat smaller cross sectional area, but with a set of fluid pipes 4 collected centrally about one single load carrying element 7 and a number of load carrying elements 7 in the form of single rods distributed about the fluid pipes 4. In between the single rods can weight elements 8 be placed, here typically rods 8" made of lead. Further it has conductors/wires 6, 6', an outer set of fluid pipes 4', channel elements 2, 3 and an outer sheath 1. This provides a compact umbilical requiring less space.

Figure 8:
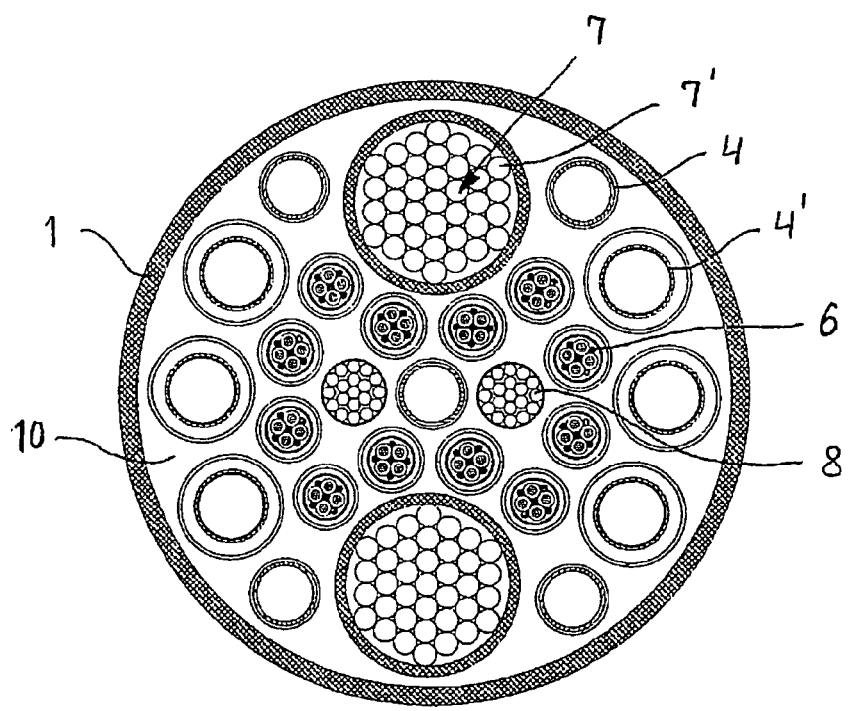
FIG. 8 shows a transversal cross section through a variant of the umbilical according to the invention without the characteristic elongated channel elements.

FIG. 8 shows another particular variant of the umbilical where channel elements are not used, but a filler substance 10 such as a foam substance. Otherwise it has the remainder elements as above described, though differently located in the cross section.

Figure 9:
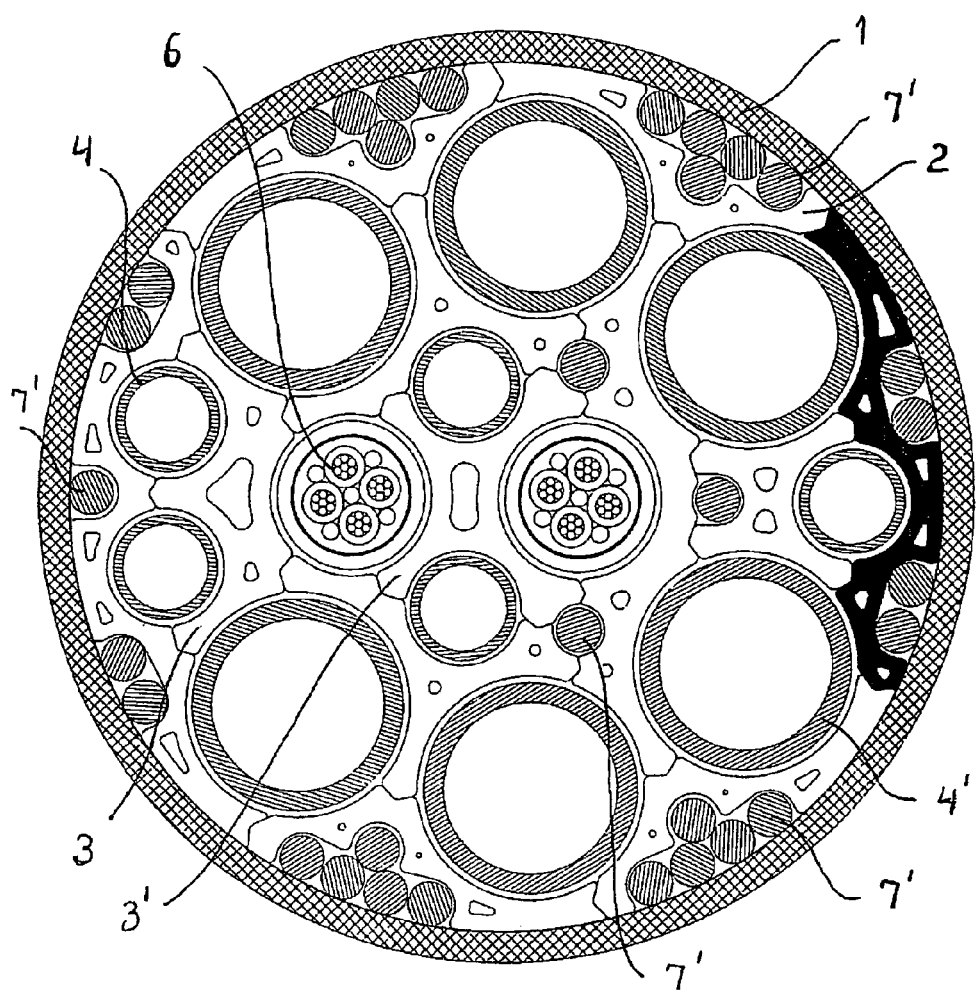
FIG. 9 shows a transversal cross section through a variant of the umbilical according to the invention where the load carrying elements consist of a number of individual rods that are not collected in a bundle.

FIG. 9 shows in particular a variant of an umbilical having a pronounced different transversal cross section, having some larger fluid pipes 4', some smaller fluid pipes 4, some smaller conductors/wires 6 and a number of load carrying elements 7 which are in the form of individual rods 7' and not bundles of rods. Moreover, it has channel elements 2, 3, 3' extending all the way in to the centre of the umbilical, and an outer sheath 1. This provides an umbilical that is easier and less expensive to manufacture.

The invention claimed is:

1. An umbilical for transmission of fluids and electric current/signals between the sea surface and equipment arranged on the sea bed, comprising:
   a plurality of pipes;
   electric conductors/wires collected in a bundle;
   a filler material arranged at least partly around and between the pipes and the conductors/wires;
   the pipes and the conductors/wires forming two concentric rings;
   the filler material comprising three concentric rings; and
   a protective sheath enclosing the pipes, conductors/wires and filler material,
   wherein the umbilical includes separate load carrying elements, said load carrying elements being light weighted rods of composite material.

2. The umbilical according to claim 1, wherein the light weight rods of composite material are carbon rods having embedded strength fibers.

3. The umbilical according to claim 2, wherein the filler material, the pipes and the conductors/wires are laid in a helix configuration about the longitudinal axis of the umbilical.

4. The umbilical according to claim 2, wherein the filler material, the pipes and the conductors/wires are laid in a substantially rectilinear configuration without substantial twisting or spiraling.

5. The umbilical according to claim 2, wherein the light weighted rods of the umbilical are collected in a spiraling bundle located centrally as a core element within the umbilical.

6. The umbilical according to claim 2, wherein the light weighted rods of the umbilical are distributed in a number of bundles located peripheral relative to the longitudinal axis of the umbilical.

7. The umbilical according to claim 2, wherein the umbilical includes weight elements in order to add mass/weight to the umbilical.

8. The umbilical according to claim 1, wherein the filler material, the pipes and the conductors/wires are laid in a substantially rectilinear configuration without substantial twisting or spiraling.

9. The umbilical according to claim 8, wherein the light weighted rods of the umbilical are collected in a spiraling bundle located centrally as a core element within the umbilical.

10. The umbilical according to claim 8, wherein the light weighted rods of the umbilical are distributed in a number of bundles located peripheral relative to the longitudinal axis of the umbilical.

11. The umbilical according to claim 1, wherein the light weighted rods of the umbilical are collected in a spiraling bundle located centrally as a core element within the umbilical.

12. The umbilical according to claim 1, wherein the light weighted rods of the umbilical are distributed in a number of bundles located peripheral relative to the longitudinal axis of the umbilical.

13. The umbilical according to claim 1, wherein the umbilical includes weight elements in order to add mass/weight to the umbilical.

14. The umbilical according to claim 1, wherein the filler material, the pipes and conductors/wires are laid in several layers viewed in a radial direction.

15. The umbilical according to claim 1, wherein the light weighted rods are distributed within the cross section of the umbilical.

16. The umbilical according to claim 1, wherein the filler material is in the form of elongated channel elements which are able to at least partly enclose the respective pipes and conductors/wires in order to keep these in position relative to each other.

17. The umbilical according to claim 1, wherein the filler material, the pipes and the conductors/wires are laid in a helix configuration about the longitudinal axis of the umbilical.

* * * * *